Feb. 6, 1951 M. G. McCOOL 2,540,900
TOOL JOINT
Filed July 3, 1948
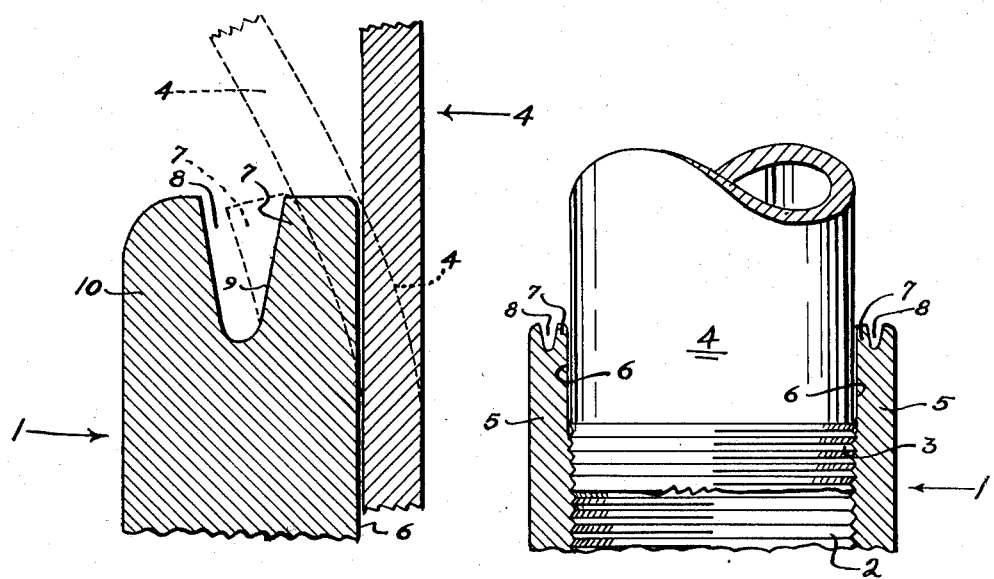
FIG. 2  FIG. I
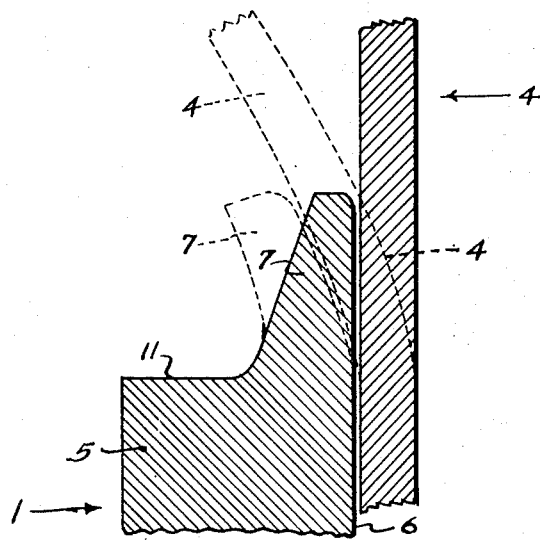
FIG. 3
Marcus G. McCool
INVENTOR,
BY
Bernard P. Miller
ATTORNEY Patented Feb. 6, 1951

2,540,900

UNITED STATES PATENT OFFICE 2,540,900

TOOL JOINT

Marcus G. McCool, Oklahoma City, Okla., assignor to American Iron and Machine Works Company, Oklahoma City, Okla.

Application July 3, 1948, Serial No. 36,892

11 Claims. (Cl. 285—146)

The present invention relates to pipe joints, and more particularly to tool joints for joining the sections of rotary well drilling drill-stem or drill-pipe.

At the present time, it is common practice among manufacturers of rotary drill-stem to install a separate tool-joint box on one end of each drill stem section, and to similarly install a tool-joint pin on the other end of the section. The ends of such box and pin connections or fittings are usually provided, on their outer ends, with tapered tool-joint threads in order to facilitate the inter-connection of the sections in assembling the drilling string. Because of the fact that these tapered threads often become worn or damaged, the box and pin fittings are usually made separate from the pipe sections in order that they may be removed for repair or replacement.

In some cases the threaded connection between the tool-joint fitting and the pipe section is accomplished by standard A. P. I. threads, in others, the connection is made with special threads, and in still other cases the fitting is expanded by heat before it is screwed upon the pipe section. In this latter process, it is common practice to provide the fitting with a longitudinally extending sleeve portion which projects beyond the threaded area, and which is shrunk around the smooth exterior portion of the pipe section when the fitting cools.

In cases where such a fitting is thus installed, it has been found that the rigidity of the fitting sleeve is so pronounced, that an annular line of fatigue developes in the pipe section at the extreme free end of the sleeve portion.

The prime object of the present invention is to provide the sleeve portion of the fitting with a means for increasing its flexibility, so that the forces which develop during drilling operation, and which tend to bend the pipe section, are prevented from concentrating in the section in a small annular area occurring at the free end of the fitting.

In carrying out the present invention the sleeve portion is weakened along longitudinal lines, so that it will flex slightly in a lateral direction at its upper end. This flexibility tends to disperse the bending forces and distribute them over a larger area of the pipe section. The present fatigue line of the pipe section, at this small area of concentration, is thereby eliminated.

A further object is to provide a female pipe fitting, including an end circumferential section, which will conformingly distort with a pipe therein when subjected to the normal bending strains encountered by drill pipe in rotary well drilling, said section having sufficient inherent flexibility to return to its normal form when such strain is removed.

Another object is to locate such flexible circumferential section next to the encircled pipe, so that the section will resiliently resist such bending forces, thereby distributing the bending strain longitudinally along the pipe.

An additional object is to so form the flexible circumferential section, that the bending forces received thereby are resisted in direct proportion to the degree of bend exerted thereon.

Other objects and purposes will be apparent from the following description when taken in conjunction with the accompanying single sheet of drawings, wherein:

Figure 1 is a fragmentary elevational view, partially in vertical section, and illustrating the preferred embodiment of the invention;

Figure 2 is an enlarged fragmentary vertical sectional view, the dotted lines being used to exaggeratingly illustrate the flexibility of the circumferential end section of the female sleeve; and, Figure 3 is a similar view illustrating a slightly different embodiment of the invention.

Like characters of reference designate like parts in those figures in which they occur.

In the drawings:

The reference 1 indicates, as a whole, a tubular or female pipe or pipe fitting, having internal threads 2 adapted to receive the external threads 3 formed on one end of a male pipe or pipe fitting 4.

The female fitting or pipe 1 has a tubular end or sleeve portion 5 which has a smooth interior surface 6. The sleeve portion 5 extends longitudinally beyond the threads 2, and is adapted to compressibly contact the exterior surface of the male pipe 4.

The structure thus far described therein above, and indicated by the reference numerals 1 to 6 inclusive, is usual to some types of present drill-pipe tool-joint construction, and such structure, per se, is not claimed to constitute the present invention. Instead, the present invention, per se, is provided in combination with the above described structure.

The present invention is carried into being by the provision of means for weakening the outer, upper, or free end portion of the sleeve 5, in order to obtain a flexible circumferential section 7 lying next to the exterior surface of the pipe 4, and spaced longitudinally from the threads 3 thereof.

In the embodiment illustrated in Figs. 1 and 2, the weakened or flexible section 7 is obtained by providing the end surface of the sleeve 5 with an endless or annular groove 8, which is machined therein. The groove 8 is preferably so formed, that the flexible section 7 is provided with a slanting or beveled exterior wall surface 9. In other words, the flexible section 7 is thinner at its outer end than it is at its base. For this reason, the outer end of the flexible section 7 will bend laterally with greater ease than will the inner or lower end thereof. The result of tapering the flexible section 7 is to obtain resilient resistance to bending movement of the pipe, such resistance being comparable to, or in proportion to, the degree to which the pipe bends.

In the embodiment of Figs. 1 and 2, the groove 8 also forms an outer annular thin portion or rim section 10 which lies remote from the exterior surface of the pipe 4. While the pipe 4 and flexible section 7 will never, during drilling operation, bend sufficiently to bring the section 7 into contact with the rim section 10, the presence of the rim section has an office in preventing the bending of the sleeve wall below the base of the section 7. It acts as a reinforcing agent to upper outer end of the sleeve 5.

However, good results have been found obtainable with the embodiment illustrated in Fig. 3, and wherein the rim section 10 has been eliminated. This embodiment is substantially identical to that of Figs. 1 and 2, except that the sleeve 5 has been cut off horizontally along a line 11 which lies vertically even with the base of the flexible section 7.

Obviously the device is susceptible of some change or alteration without defeating the practicability thereof, and I therefore do not wish to be confined to the preferred embodiment shown and described herein, further than I am limited by the scope of the appended claims.

I claim:

1. In a rotary drill-pipe tool joint wherein a male section is threadedly engaged within a female section, and wherein the female section has an end portion which surrounds the male section and which extends longitudinally beyond the mating threads of the two sections, an annular groove formed in the end edge of said portion for weakening the same laterally, for increasing its flexibility.

2. In a rotary drill-pipe tool joint wherein a male section is threadedly engaged within a female section has an end portion which surrounds the male section and which extends longitudinally beyond the mating threads of the two sections, an annular groove formed in the end edge of said portion for uniformly weakening the same laterally adjacent the extreme end thereof, for increasing its flexibility.

3. In a rotary drill-pipe tool joint wherein a male section is threadedly engaged within a female section, and wherein the female section has an end portion which surrounds the male section and which extends longitudinally beyond the mating threads of the two sections, an annular groove formed in the end edge of said portion for weakening the same laterally, for distributing lateral bending forces longitudinally along said portion.

4. In a rotary drill-pipe tool joint wherein a male section is threadedly engaged within a female section, and therein the female section has an end portion which surrounds the male section and which extends longitudinally beyond the mating threads of the two sections, an annular groove formed in the end edge of said portion for uniformly weakening the same laterally adjacent the extreme end thereof, for distributing lateral bending forces longitudinally along said portion.

5. In a rotary drill-pipe tool joint wherein a male section is threadedly engaged within a female section and wherein the female section has an end portion which surrounds the male section and which extends longitudinally beyond the mating threads of the two sections, an annular groove formed in the end edge of said portion for weakening the same laterally, for preventing a concentration of bending forces at the free end of said portion.

6. In a rotary drill-pipe tool joint, wherein a male section is threadedly engaged within a female section, and wherein the female section has an end portion which surrounds the male section and which extends longitudinally beyond the mating threads of the two sections, an annular groove formed in the end edge of said portion for uniformly weakening the same laterally adjacent the extreme end thereof, for preventing a concentration of bending forces at the free end of said portion.

7. In a rotary drill-pipe tool joint wherein a male section is threadedly engaged within a female section, and wherein the female section has an end portion which surrounds the male section and which extends longitudinally beyond the mating threads of the two sections, an annular groove formed in the end edge of said portion for weakening the same laterally, for longitudinally dispersing bending forces and preventing fatigue in the male section at the point surrounded by the free end of said female portion.

8. In a rotary drill-pipe tool joint wherein a male section is threadedly engaged within a female section and wherein a female section has an end portion which surrounds the male section and which extends longitudinally beyond the mating threads of the two sections, an annular groove formed in the end edge of said portion for uniformly weakening the same laterally adjacent the extreme end thereof, for longitudinally dispersing bending forces and preventing fatigue in the male section at the point surrounded by the free end of said female portion.

9. In a rotary drill-pipe tool joint wherein a male section is threadedly engaged within a female section, and wherein the female section has an end portion which surrounds the male section and which extends longitudinally beyond the mating threads of the two sections, an annular groove formed in the end edge of said portion for distributing lateral bending forces longitudinally along said pipe.

10. In a rotary drill-pipe tool joint wherein a male section is threadedly engaged within a female section, and wherein the female section has an end portion which surrounds the male section and which extends longitudinally beyond the mating threads of the two sections, an annular groove formed in the end edge of said portion for preventing a concentration of bending forces at the free end of said pipe.

11. In a rotary drill-pipe tool joint wherein a male section is threadedly engaged within a female section, and wherein the female section has an end portion which surrounds the male section and which extends longitudinally beyond the mating threads of the two sections, an annular groove formed in the end edge of said portion for longitudinally dispersing bending forces and preventing fatigue in the male section at the point surrounded by the free end of said female portion.

MARCUS G. McCOOL.

REFERENCES CITED

The following references are of record in the file of this patent:

UNITED STATES PATENTS

| Number | Name | Date |
|--------|------|------|
| 136,365 | Conner | Mar. 4, 1873 |
| 218,701 | Bray | Aug. 19, 1879 |